US011327818B2

(12) United States Patent
Jeon et al.

(10) Patent No.: US 11,327,818 B2
(45) Date of Patent: May 10, 2022

(54) ELECTRONIC DEVICE AND METHOD FOR MANAGING DATA INPUT INTO INPUT FIELD

(71) Applicant: Samsung Electronics Co., Ltd., Gyeonggi-do (KR)

(72) Inventors: Bu Nam Jeon, Gyeonggi-do (KR); Kyung Tae Kim, Gyeonggi-do (KR); Ho Sung You, Gyeonggi-do (KR); Seon Ho Lee, Gyeonggi-do (KR); Yoon Jeong Choi, Seoul (KR); Tae Ho Ha, Seoul (KR); Chang Ho Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 37 days.

(21) Appl. No.: 16/197,789

(22) Filed: Nov. 21, 2018

(65) Prior Publication Data
US 2019/0163341 A1    May 30, 2019

(30) Foreign Application Priority Data

Nov. 24, 2017    (KR) .................. 10-2017-0158718

(51) Int. Cl.
*G06F 9/54*    (2006.01)
*G06F 16/957*    (2019.01)
(Continued)

(52) U.S. Cl.
CPC ............ *G06F 9/543* (2013.01); *G06F 3/0482* (2013.01); *G06F 3/0488* (2013.01);
(Continued)

(58) Field of Classification Search
CPC .......................... G06F 16/9577; G06F 9/543
See application file for complete search history.

(56) References Cited

U.S. PATENT DOCUMENTS 8,429,551 B2    4/2013  Kim et al.
8,621,091 B1 *  12/2013 Akalin ................ G06F 16/9574
                                                      709/228
(Continued)

FOREIGN PATENT DOCUMENTS

JP          2015-75959 A      4/2015
KR    10-2014-0094380 A      7/2014
(Continued)

OTHER PUBLICATIONS

Debra Dalgleish, Hide Used Items in Excel Drop Down List, May 25, 2017, a blog article found at https://contexturesblog.com/archives/2017/05/25/hide-used-items-in-excel-drop-down-list/, 8 pages (Year: 2017).*

(Continued)

*Primary Examiner* — Scott T Baderman
*Assistant Examiner* — Seung Woon Jung
(74) *Attorney, Agent, or Firm* — Cha & Reiter, LLC

(57) ABSTRACT

An electronic device and method are disclosed. The electronic device includes a processor which implements the method. The method includes: executing an application in a first state, displaying a first user interface for the application on a display, the first UI including a first input field and a first identifier identifying the first input field, receiving data input to the first input field, in response to detecting a particular event, changing the first operational state to a second operational state, re-executing the application in the second operational state, transmitting data for a second UI of the re-executed application to an external display device for display, the second UI including a second input field and a second identifier corresponding to the second input field, and inserting the received data input into the second input field when the first identifier corresponds to the second identifier.

15 Claims, 21 Drawing Sheets

(51) Int. Cl.
*G06F 40/274* (2020.01)
*G06F 3/0482* (2013.01)
*G06F 3/04842* (2022.01)
*G06F 3/0488* (2022.01)
*H04L 67/75* (2022.01)

(52) U.S. Cl.
CPC ...... *G06F 3/04842* (2013.01); *G06F 16/9577* (2019.01); *G06F 40/274* (2020.01); *H04L 67/36* (2013.01)

(56) References Cited

U.S. PATENT DOCUMENTS

| | | | |
|---|---|---|---|
| 9,582,368 | B2 | 2/2017 | Liu et al. |
| 9,607,080 | B2 | 3/2017 | Yokoyama et al. |
| 9,753,926 | B2 | 9/2017 | Flake et al. |
| 2006/0179404 | A1 | 8/2006 | Yolleck et al. |
| 2008/0201656 | A1 | 8/2008 | Kim et al. |
| 2009/0292981 | A1* | 11/2009 | Akiyama ............ G06F 40/166 715/226 |
| 2013/0290828 | A1 | 10/2013 | Flake et al. |
| 2014/0298158 | A1 | 10/2014 | Liu et al. |
| 2015/0026179 | A1 | 1/2015 | Yokoyama et al. |
| 2016/0065648 | A1* | 3/2016 | Kim ................... G06F 3/0482 715/748 |
| 2017/0011010 | A1 | 1/2017 | Eom et al. |
| 2017/0357627 | A1* | 12/2017 | Peterson ............ G06F 40/174 |
| 2018/0052843 | A1 | 2/2018 | Flake et al. |
| 2018/0285049 | A1* | 10/2018 | Lim ................... G06F 3/1431 |
| 2018/0330694 | A1* | 11/2018 | Klein .................. G06F 3/048 |
| 2019/0129666 | A1* | 5/2019 | Okuno ............... G06F 3/1253 |

FOREIGN PATENT DOCUMENTS

| | | |
|---|---|---|
| KR | 10-2015-0095470 A | 8/2015 |
| KR | 10-2017-0006432 A | 1/2017 |
| KR | 10-2017-0055227 A | 5/2017 |

OTHER PUBLICATIONS

European Search Report dated Mar. 8, 2019.
Roto, et al.; "Perception of Narrow Web Pages on a Mobile Phone"; Proceedings of the 19th International Symposium on Human Factors in Telecommunication; Dec. 4, 2003; XP055563329.
Kane, et al; "Exploring Cross-Device Web Use on PCs and Mobile Devices"; Jan. 2009; Springer International Publishing; XP055563317.
International Search Report dated Feb. 14, 2019.
Wang Shaohua et al.; "An Intelligent Framework for Auto-filling Web Forms from Different Web Applications"; 2013 IEEE Ninth World Congress on Services, IEEE; Jun. 28, 2013; pp. 175-179; XP032521013.
European Search Report dated Sep. 13, 2021.

* cited by examiner

LOGIN

CREATE ACCOUNT

411

Lee    FIRST NAME

USER NAME

CREATE PASSWORD

VERIFY PASSWORD

DATE OF BIRTH

YEAR   MONTH   DAY

GENDER

GENDER

FIG. 4A

```
▽<div class="clearfix">
  ▽<div class="sign-up">
    ▽<div class="sign-box">
425──▽<form class="createaccount-form" id="createaccount" name=
      "createaccount" action="SignUp?dsh=-8832961228828585094&service"
      method="post">
        <input type="hidden" name="hl" id="hl" value="ko">
        <input type="hidden" name="continue" id="continue" value="https:/
        /www.google.co.kr/?
        gfe_rd=cr&ei=eRCdWcy2PK6M8QehsZXgDw&gws_rd=ssl">
        <input type="hidden" name="timeStmp" id="timeStmp" value=
        "1503465613173">
        <input type="hidden" name="secTok" id="secTok" value=".AG5fkS-
        9XdYzz015gjmHNaemLJF-geQKag==">
        <input type="hidden" name="dsh" id="dsh" value=
        "-8832961228828585097">
        <input type="hidden" name="ktl" id="kt1" value>
        <input type="hidden" name="ktf" id="ktf">
        <input type="hidden" id="_utf8" name="_utf8" value="">
        <input type="hidden" name="bgresponse" id="bgresponse" value=
        "js_disabled">
424──▽<div class="form-element multi-field name" id="name-form-element">
423──  ▽<fieldset>
         ▷<legend>...</legend>
422──    ▽<label id="lastname-label" class="lastname">
           <strong>성</strong>
421──      <input type="text" value name="Lastname" id="Lastname"
           spellcheck="false"> == $0
           <span class="placeholder-text" id="lastname-placeholder"
           style="display: none;">성</span>
         </label>
         ▷<label id="firstname-label" class="firstname">...</label>
         <fieldset>
         <span role="alert" class="errormsg" id="errormsg_0_FirstName">
         THIS IS A REQUIRED FIELD.</span>
         <span role="alert" class="errormsg" id="errormsg_0_LastName">
         </span>
```

FIG. 4B

```
▽<div class="clearfix">
  ▽<div class="sign-up">
    ▽<div class="sign-box">
521—     ▽<form class="createaccount-form" id="createaccount" name=
         "createaccount" action="SignUp?dsh=-8832961228828585094&service"
         method="post">
           <input type="hidden" name="hl" id="hl" value="ko">
           <input type="hidden" name="continue" id="continue" value="https:/
           /www.google.co.kr/?
           gfe_rd=cr&ei=eRCdWcy2PK6M8QehsZXgDw&gws_rd=ssl">
           <input type="hidden" name="timeStmp" id="timeStmp" value=
           "1503465613173">
           <input type="hidden" name="secTok" id="secTok" value=".AG5fkS-
           9XdYzz015gjmHNaemLJF-geQKag==">
           <input type="hidden" name="dsh" id="dsh" value=
           "-8832961228828585097">
           <input type="hidden" name="ktl" id="ktl" value>
           <input type="hidden" name="ktf" id="ktf">
           <input type="hidden" id="_utf8" name="_utf8" value="">
           <input type="hidden" name="bgresponse" id="bgresponse" value=
           "js_disabled">
522—       ▽<div class="form-element multi-field name" id="name-form-element">
             ▽<fieldset>
523—           ▷<legend>...</legend>
524—           ▽<label id="lastname-label" class="lastname">
                 <strong>성</strong>
525—             <input type="text" value name="Lastname" id="Lastname2"
                 spellcheck="false"> == $0
                 <span class="placeholder-text" id="lastname-placeholder"
                 style="display: none;">성</span>
               </label>
               ▷<label id="firstname-label" class="firstname">...</label>
               <fieldset>
               <span role="alert" class="errormsg" id="errormsg_0_FirstName">
               THIS IS A REQUIRED FIELD.</span>
               <span role="alert" class="errormsg" id="errormsg_0_LastName">
               </span>
```

ELECTRONIC DEVICE AND METHOD FOR MANAGING DATA INPUT INTO INPUT FIELD

CROSS-REFERENCE TO RELATED APPLICATION(S)

This application is based on and claims priority under 35 U.S.C. § 119 to Korean Patent Application No. 10-2017-0158718, filed on Nov. 24, 2017, in the Korean Intellectual Property Office, the disclosure of which is incorporated by reference herein its entirety.

BACKGROUND

1. Field

The present disclosure relates to a technique in which an electronic device manages data input into an input field included in a web page.

2. Description of Related Art

The use of mobile electronic devices in the world, such as smart phones, tablet personal computers, and wearable devices, continues increasing. These electronic devices performs increasingly diverse functions, such as calls, wireless communication, video playback, and web searches.

The electronic device is used independently or used while being connected to an external display device, such as a monitor or a television set. For example, the electronic device is wiredly or wirelessly connected to the monitor or the television set to output contents, such as images or text to the external display device.

The above information is presented as background information only to assist with an understanding of the present disclosure. No determination has been made, and no assertion is made, as to whether any of the above might be applicable as prior art with regard to the present disclosure.

SUMMARY

The electronic device may be connected to the external display device while performing an application which displays a user interface (UI) including an input field. As an example, when the electronic device is connected to the external display device, the electronic device may terminate a presently executing application and then restart execution or display another UI different from the displayed UI on the external display device. As another example, when the electronic device is connected to the external display device while data is input into the input field, oftentimes the input data is lost. As another example, when an event such as a change in user occurs, the electronic device will terminate the displayed web page and display another web page, oftentimes in another format. In these cases, data input into an input field are often lost.

Aspects of the present disclosure are to address at least the above-mentioned problems and/or disadvantages and to provide at least the advantages described below. Accordingly, an aspect of the present disclosure is to an electronic device capable of managing data to input data, which are input into an input field included in a web page in a first format, into an input field included in a web page in a second format.

In accordance with an aspect of the present disclosure, an electronic device is disclosed including a display, a communication circuit, at least one processor and a memory storing instructions executable by the at least one processor to cause the electronic device to display on the display a first web page in a first format, the first web page including a first input field and a first markup language tag identifying the first input field, receive an input of data to the first input field, store the input data in the memory, display a second web page in a second format on the display or an external display device, wherein the second web page includes at least a portion of content of the first web page, a second input field, and a second markup language tag identifying the second input field, comparing the first markup language tag to the second markup language tag; and based on a result of the comparing, insert the stored input data into the second input field.

In accordance with another aspect of the present disclosure, an electronic device is disclosed, including: a touch screen display, at least one processor, and a memory storing instructions executable by the at least one processor to cause the electronic device to execute an application in a first operational state, display a first user interface (UI) for the application on the touch screen display, the first UI including a first input field and a first identifier identifying the first input field, receive data input to the first input field via the touch screen display, in response to detecting a particular event, changing the first operational state to a second operational state, re-execute the application in the second operational state in response to the detected event, transmit data for a second UI of the re-executed application to an external display device for display, the second UI including a second input field and a second identifier corresponding to the second input field, insert the received data input into the second input field when the first identifier corresponds to the second identifier.

In accordance with another aspect of the present disclosure, a method in an electronic device is disclosed, including: executing an application in a first operational state, displaying a first user interface (UI) for the application on a touch screen display, the first UI including a first input field and a first identifier identifying the first input field, receiving data input to the first input field via the touch screen display, in response to detecting a particular event, changing the first operational state to a second operational state, re-executing the application in the second operational state in response to the detected event, transmitting data for a second UI of the re-executed application to an external display device for display, the second UI including a second input field and a second identifier corresponding to the second input field, and inserting the received data input into the second input field when the first identifier corresponds to the second identifier.

According to the above, the electronic device may automatically manage the data which are input into the input field even though the application is restarted.

According to the above, the electronic device may automatically display a list including data which are not input yet, and thus the user may input data conveniently.

According to the above, the electronic device may display a data list in the order that is appropriate for the input field, and thus convenience is enhanced.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 4A is a view showing a first UI in which data are input into one of a plurality of first input fields according to an embodiment;

FIG. 4B is a view showing an HTML code of the first UI shown in FIG. 4A according to an embodiment;

FIG. 5B is a view showing an HTML code of the second UI shown in FIG. 5A according to an embodiment;

FIG. 6A is a view showing a first UI in which data are input into one of a plurality of first input fields according to an embodiment;

With regard to description of drawings, the same or similar components may be designated by the same or similar reference numerals.

DETAILED DESCRIPTION

Figure 1:
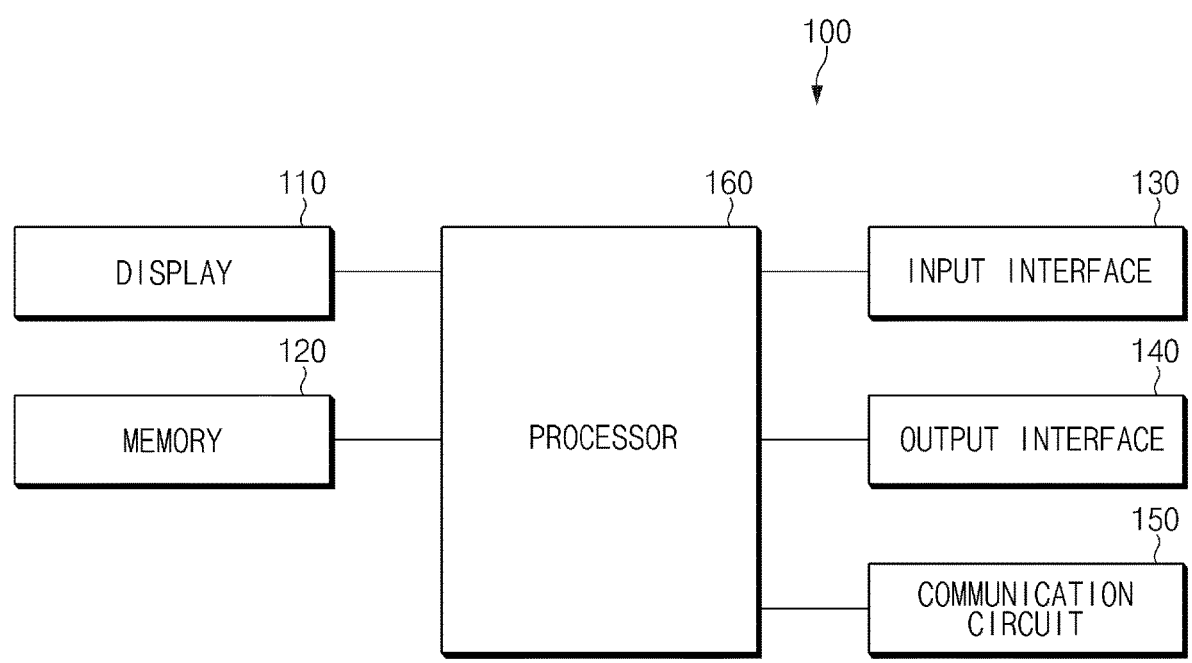
FIG. 1 is a block diagram showing an electronic device according to an embodiment.

Hereinafter, various embodiments of the present disclosure will be described with reference to accompanying drawings. Accordingly, those of ordinary skill in the art will recognize that modification, equivalent, and/or alternative on the various embodiments described herein can be variously made without departing from the present disclosure. With regard to description of drawings, similar components may be marked by similar reference numerals.

FIG. 1 is a block diagram showing an electronic device according to an embodiment.

Referring to FIG. 1, the electronic device 100 may include a display 110, a memory 120, an input interface 130, an output interface 140, and a processor 160.

According to an embodiment, the display 110 may output an execution screen of an application (e.g., a browser). In an embodiment, the display 110 may be implemented with a touch panel (e.g., a touch screen display). When the touch screen display is implemented according to an embodiment, the touch screen display may display a soft input panel and may receive data via the soft input panel.

According to an embodiment, the memory 120 may be electrically connected to the processor 160 and may store instructions executed by the processor 160. According to an embodiment, the memory 120 may store an application (e.g., a web browser program) executed by the processor 160.

According to an embodiment, the input interface 130 may obtain data input into an input field. In an embodiment, a keyboard or mouse may be connected to the electronic device 100 via the input interface 130.

According to an embodiment, the output interface 140 may functionally connect the electronic device to an external display device. According to an embodiment, the processor 160 may transmit a screen of the application to the external display device via the output interface 140. For example, the processor 160 may transmit data related to a user interface (UI) to the external display device via the output interface 140 such that the UI of the application is displayed on the external display device.

According to an embodiment, the communication circuit 150 may allow the external display device to communicate with the electronic device 100. According to an embodiment, the processor 160 may transmit the data related to the UI to the external display device via the communication circuit 150 and may allow the external display device to display the UI.

The processor 160 may execute the instructions stored in the memory 120 and may perform operations described below.

According to an embodiment, the electronic device 100 may include the communication circuit 150. For instance, the electronic device 100 may be connected to an external input device or the external display device via the communication circuit 150 (e.g., a wired communication circuit or a wireless communication circuit).

According to an embodiment, the electronic device 100 may be wireless communicated to the external input device via the communication circuit 150. According to an embodiment, the processor 160 may receive an input that selects data included in a data list from the external input device that is wireless connected to the processor 160. According to an embodiment, when the electronic device 100 is connected to the external display device, the processor 160 may transmit the screen of the application to the external display device via the communication circuit such that the screen of the application is displayed on the external display device.

Figure 2A:
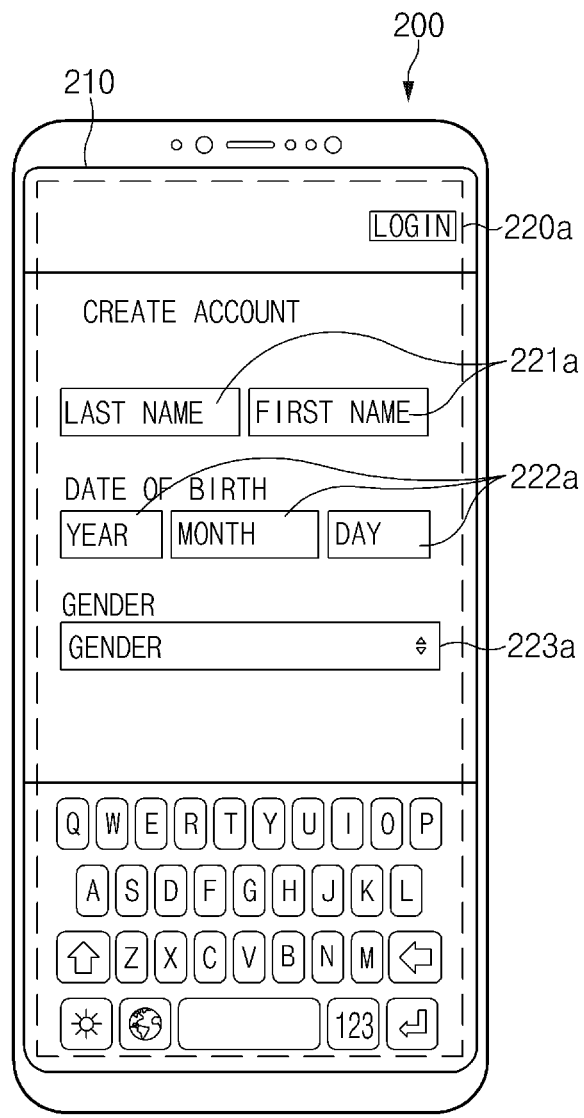
FIG. 2A is a view showing an electronic device displaying a first UI including a plurality of first input fields according to an embodiment.

FIG. 2A is a view showing an example electronic device displaying a first UI including a plurality of first input fields according to an embodiment.

Referring to FIG. 2A, the electronic device 200 (e.g., the electronic device 100 of FIG. 1) may include a display 210 (e.g., the display 110 of FIG. 1) and an input interface (e.g., the input interface 130 of FIG. 1).

According to an embodiment, the processor 160 may execute the application in a first "driving" environment (e.g., an operational state/environment in which the external display device is not connected to the electronic device) and may display the first UI 220a of the application on the display 210. According to an embodiment, the first UI 220a may include one or more first input fields 221a, 222a, and 223a.

According to an embodiment, the one or more first input fields 221a, 222a, and 223a may include fields for text input, numeric input, selection of preset options, or other different types of input fields. For example, the first input field 221a may allow entry of a name using text input, and the first input field 222a may allow entry of a date of birth using numeric inputs. The first input field 223a may allow selection of a preset gender option per the selection input type of input field.

Figure 2B:
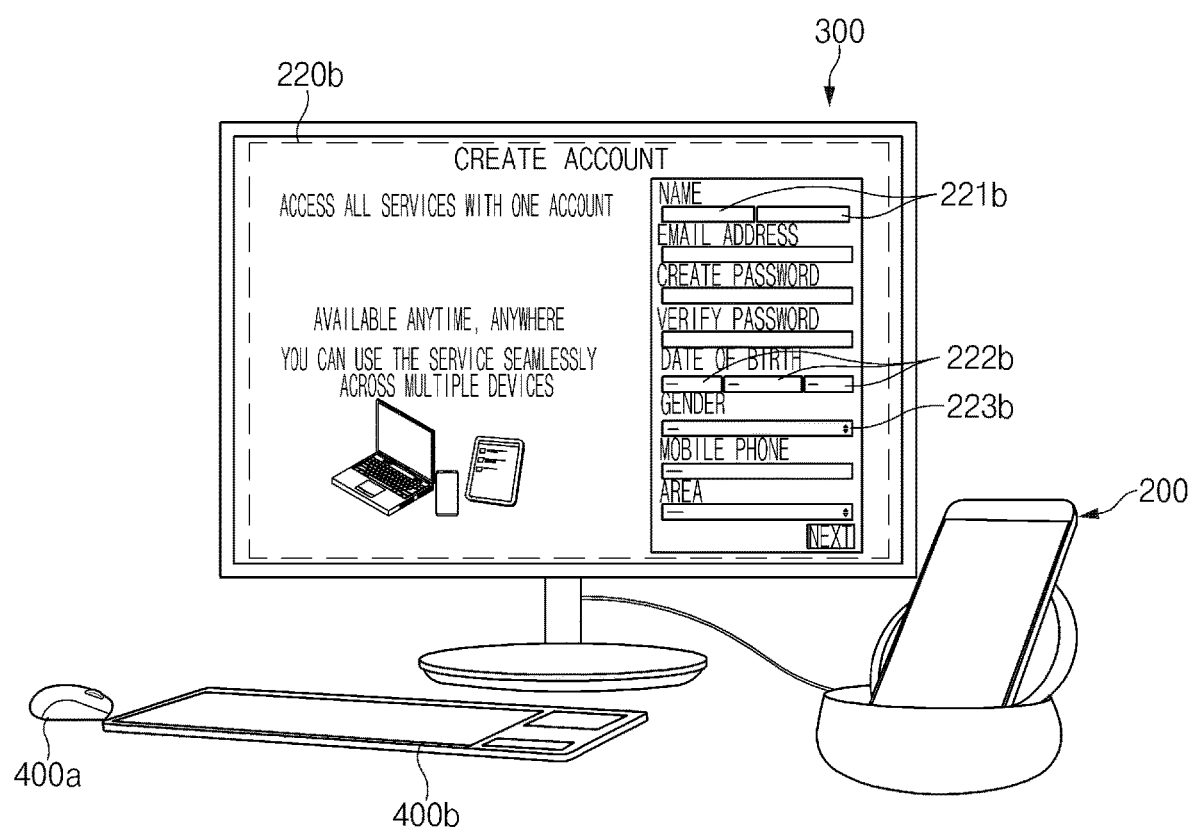
FIG. 2B is a view showing an electronic device displaying a second UI including a plurality of second input fields on an external display device according to an embodiment.

FIG. 2B is a view showing an electronic device displaying a second UI including a plurality of second input fields on an external display device according to an embodiment.

Referring to FIG. 2B, the electronic device 200 may be connected to the external display device 300 and external input devices 400a and 400b (e.g., a mouse or keyboard). According to an embodiment, the electronic device 200 may be wiredly connected to the external display device 300 via the output interface 140 (e.g., by a cable), or may be wirelessly connected to the external display device 300 via a wireless communication circuit. According to an embodiment, the processor 160 may transmit the data for the UI of the application to the external display device 300, to facilitate display of the UI of the application on the external display device 300. According to an embodiment, the application executed in FIG. 2B may be substantially the same as the application executed by the processor 160 in FIG. 2A. According to an embodiment, the electronic device 200 may be wiredly connected to the external input devices 400a and 400b via the input interface 130 (e.g., by one or more cables), or wirelessly connected to the external input devices 400a and 400b via the wireless communication circuit. According to an embodiment, the processor 160 may receive an input via the external input devices 400a and 400b.

According to an embodiment, the processor 160 may execute the application in a second driving environment (e.g., an environment or operational state in which the external display device 300 is connected to the electronic device) and may transmit the data for the second UI 220b of the application to the external display device 300 for display. According to an embodiment, the external display device 300 may thereby display the second UI 220b. According to an embodiment, the second UI 220b may include one or more second input fields 221b, 222b, and 223b. According to an embodiment, the one or more second input fields 221b, 222b, and 223b may facilitate text input, numeric input, or selections of preset options according to a selection input type of input field.

According to an embodiment, the processor 160 may execute the application in the first driving environment and may display the first UI of the application on the display as shown in FIG. 2A. In an embodiment, when an application execution environment is changed to the second driving environment, the processor 160 may transmit data for the second UI to the external display device such that the second UI of the application is displayed on the external display device.

Figure 3:
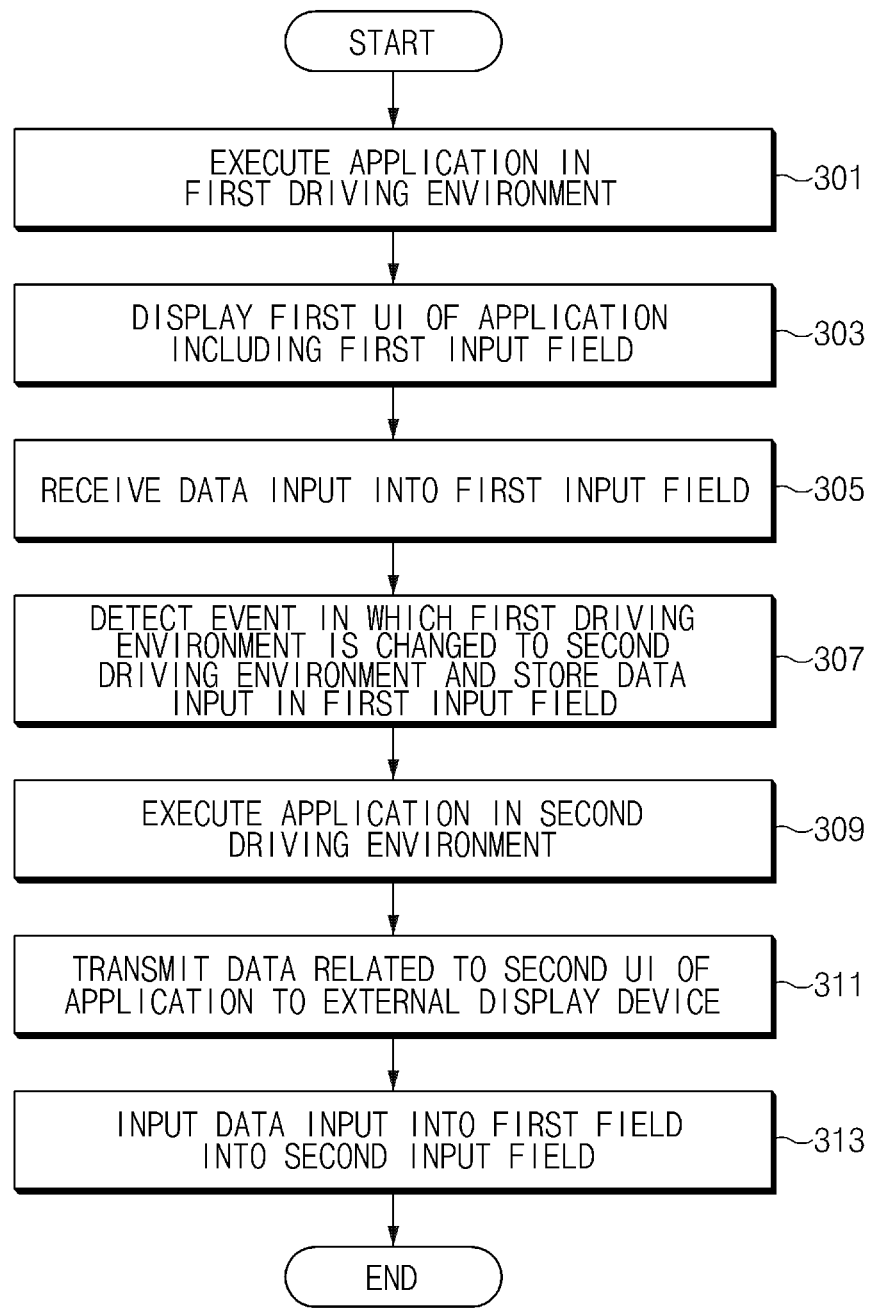
FIG. 3 is a flowchart showing a method for managing data according to an embodiment.

FIG. 3 is a flowchart showing a method for managing data according to an embodiment.

Hereinafter, it is assumed that the electronic device 100 of FIG. 1 executes a process of FIG. 3. As another example, in the descriptions of FIG. 3, operations described as being performed by the electronic device 100 may be understood as being controlled by the processor 160 of the electronic device 100. The operations described as being performed by the electronic device 100 may be implemented by the instructions that are capable of being performed (or executed) by the processor 160 of the electronic device 100. The instructions may be stored in, for example, a computer recording medium or the memory 120 of the electronic device 100 shown in FIG. 1.

In operation 301, the processor 160 may execute the application in the first driving environment. According to an embodiment, and as described above, the first driving environment may be the environment in which the external display device is not connected to the electronic device 100.

In operation 303, the processor 160 may display the first UI of the application including the first input field on the touch screen display. According to an embodiment, the first UI may include the first input fields. According to an embodiment, the first UI may include at least one of a first identifier (e.g., ID or Class) corresponding to the first input field, a type of the first input field (e.g., the text input type, the numeric input type, or the selection input type), or a type information (e.g., a type information indicating that data capable of being entered into the first input field are numeric data) of the data that may be input into the first input field.

In operation 305, the processor 160 may receive the data input into the first input field via the touch screen display. According to an embodiment, the processor 160 may receive the data input into the first input field by inputs to an external input device. According to an embodiment, when there are multiple instances of the first input field, the processor 160 may receive the data input into one or more of the first input fields among the plurality of first input fields.

According to an embodiment, the processor 160 may at least temporarily store the input data in the memory 120.

In operation 307, the processor 160 may detect an event in which the application execution environment is changed to the second driving environment from the first driving environment. According to an embodiment, as described above, the second driving environment may be the environment in which the electronic device 100 is connected to the external display device.

According to an embodiment, when an event is detected in which the application execution environment is changed from the first driving environment to the second driving environment, the processor 160 may at least temporarily store any data input into the first input field in the memory 120.

In operation 309, the processor 160 may execute the application in the second driving environment in response to the detection of the event.

According to an embodiment, the processor 160 may store information pertaining to at least one first input field into which the data was input. The processor 160 may further store the data itself that was input into the first input field in the memory 120, in response to the detection of the event.

In operation 311, the processor 160 may transmit the data related to the second UI to the external display device. The processor 160 may cause the second UI of the application to be displayed on the external display device, by transmitting the data related to the second UI to the external display device. According to an embodiment, the second UI may thereby include the second input fields. According to an embodiment, the second UI may include at least one of a second identifier corresponding to the second input field, a type of the second input field, or a type information of the data that may be input into the second input field.

In operation 313, the processor 160 may insert the data input into the first input field (e.g., that was stored in memory responsive to detection of the event) into the second input field, when the processor 160 determines that the first identifier and the second identifier are the same as or correspond to each other.

For instance, the processor 160 may receive the data of "Lee" in the first input field having a first identifier or ID of "last name" in the first UI (operation 305). When the application execution environment is changed to the second driving environment, the processor 160 may store the data of "Lee", for insertion into the second input field having the ID of "last name" as the second identifier in the second UI displayed on the external device. Accordingly, the data will not thereby be lost during the transition in display configuration.

In an embodiment, when the first identifier and the second identifier are not the same as or do not correspond to each other (e.g., the ID of the first input field and the ID of the second input field are not the same as or do not correspond to each other) and the type of the first input field and the type of the second field are the same as each other, the processor 160 may input the data, which are input into the first input field, into the second input field. According to an embodiment, when the second input field having the ID that is the same as or corresponding to the ID of the first input field does not exist in the second UI, the processor 160 may input the data, which are input into the first input field, into the second input field having a class which is the same as or corresponding to a class of the first input field.

According to an embodiment, when the second input field having the identifier that is the same as or corresponding to the identifier of the first input field does not exist in the second UI, the processor 160 may input the data, which are input into the first input field of the numeric input type, into the second input field of the numeric input type of the second UI.

In an embodiment, when the first identifier and the second identifier are not the same as or do not correspond to each other and the type information of the data that may be input into the first input field and the type information of the data that may be input into the second input field are the same as or correspond to each other, the processor 160 may input the data input into the first input field into the second input field. For instance, when the second input field having the second identifier that is the same as or corresponding to the first identifier of the first input field does not exist in the second UI, the processor 160 may input the data, which are input into the first input field that allows English character to be entered, into the second input field that allows English character to be entered.

According to an embodiment, the first input field corresponds to a child node of a first tree structure whose each node has an identifier, and the second input field corresponds to a child node of a second tree structure whose each node has an identifier.

According to an embodiment, a parent node of a node corresponding to the input field may be a label node, a parent node of the label node may be a "fieldset" node, a parent node of the fieldset node may be a div node, and a parent node of the div node may be a form node. According to an embodiment, all the label node, the fieldset node, the dive node, and the form node may correspond to the parent node of the child node corresponding to the input field.

According to an embodiment, when the first identifier and the second identifier are not the same as or do not correspond to each other and the identifier of the parent node of the child node corresponding to the first input field and the identifier of the parent node of the child node corresponding to the second input field are the same as or correspond to each other, the processor 160 may input the data input into the first input field into the second input field.

According to an embodiment, the processor 160 may use the identifier (e.g., tag, id, or class of the parent node) of the parent node to determine whether the first input field and the second input field are the same as or correspond to each other.

Hereinafter, an embodiment in which the processor 160 inputs the data input into the first input field into the second input field using the identifier of the parent node of the child node corresponding to the first input field and the identifier of the parent node of the child node corresponding to the second input field.

FIG. 4A is a view showing a first UI in which data are input into one of a plurality of first input fields according to an embodiment. FIG. 4B is a view showing an HTML code of the first UI shown in FIG. 4A according to an embodiment.

Figure 5A:
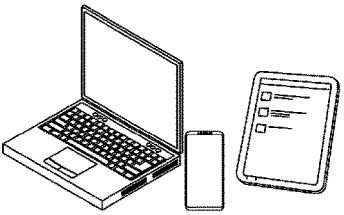
FIG. 5A is a view showing a second UI including a plurality of second input fields according to an embodiment.
Figure 5C:
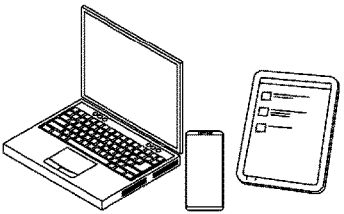
FIG. 5C is a view showing a second UI in which data are input into one of a plurality of second input fields according to an embodiment.

FIG. 5A is a view showing a second UI including a plurality of second input fields according to an embodiment. FIG. 5B is a view showing an HTML code of the second UI shown in FIG. 5A according to an embodiment. FIG. 5C is a view showing a second UI in which data are input into one of a plurality of second input fields according to an embodiment.

FIG. 4A shows the first UI displayed on the display 110 after performing operation 305 of FIG. 3. Referring to FIG. 4A, the text data "Lee" has been input into a first input field 411 having "Lastname" as an ID, designated for entering a user's last name among a plurality of first input fields depicted.

Referring to FIG. 4B, a parent node of a child node 421 corresponding to the first input field 411 for entering the last name may be a label node 422, and the ID of the label node 422 may be "lastname-label". A parent node of the label node 422 may be the fieldset node 423, and the id of the fieldset node 423 may not exist. The ID of the div node 424 corresponding to the parent node of the fieldset node 423 may be "name-form-element". A parent node of the div node 424 may be a form node 425, and the id of the form node 425 may be "createaccount".

FIG. 5A shows the second UI displayed on the external display device after operation 307 and before operation 309 of FIG. 3. Referring to FIG. 5A, the second UI includes a plurality of second input fields 510, as depicted.

Referring to FIG. 5B, a node that has the same ID as "Lastname" of the first input field 411 may not exist. Referring to FIG. 5B, the ID of the form node 521 is "createaccount". The ID of the div node 522 may be "name-form-element". The fieldset node 523 may have no ID. The ID of the label node 524 may be "lastname-label". The ID of the child node 525 of the label node 524 may be "Lastname2".

According to an embodiment, since there is no node that has the same ID as "Lastname" of the first input field, the processor 160 may determine the second input field into which the data of "Lee" is to be entered would be the field using the ID "lastname-label" of the label node 422, based on correspondence to the parent node of the child node, which in turn corresponds to the first input field.

Referring to FIG. 5B, since there is the label node 524 having the id "lastname-label", the processor 160 may input the data of "Lee" into the second input field corresponding to the child node 525 of the label node 524.

According to an embodiment, the processor 160 may input the data of "Lee", which are input in the first UI, into the second input field 531 corresponding to the child node 525 of the label node 524 having the id "lastname-label" as shown in FIG. 5C.

In an embodiment, when the first identifier and the second identifier are not the same as or do not correspond to each other (e.g., ID of the first input field and ID of the second input field are not the same as or do not correspond to each other), the processor 160 may input the data input into the first input field into the second input field using surrounding information of the first input field and surrounding information of the second input field. For example, the processor 160 may input the data input into the first input field into the second input field related to the surrounding information that is the same as or corresponding to the surrounding information of the first input field.

According to an embodiment, the surrounding information of the input field may be a text displayed around the input field (e.g., an upper end of the input field) in the web page.

Figure 6A:
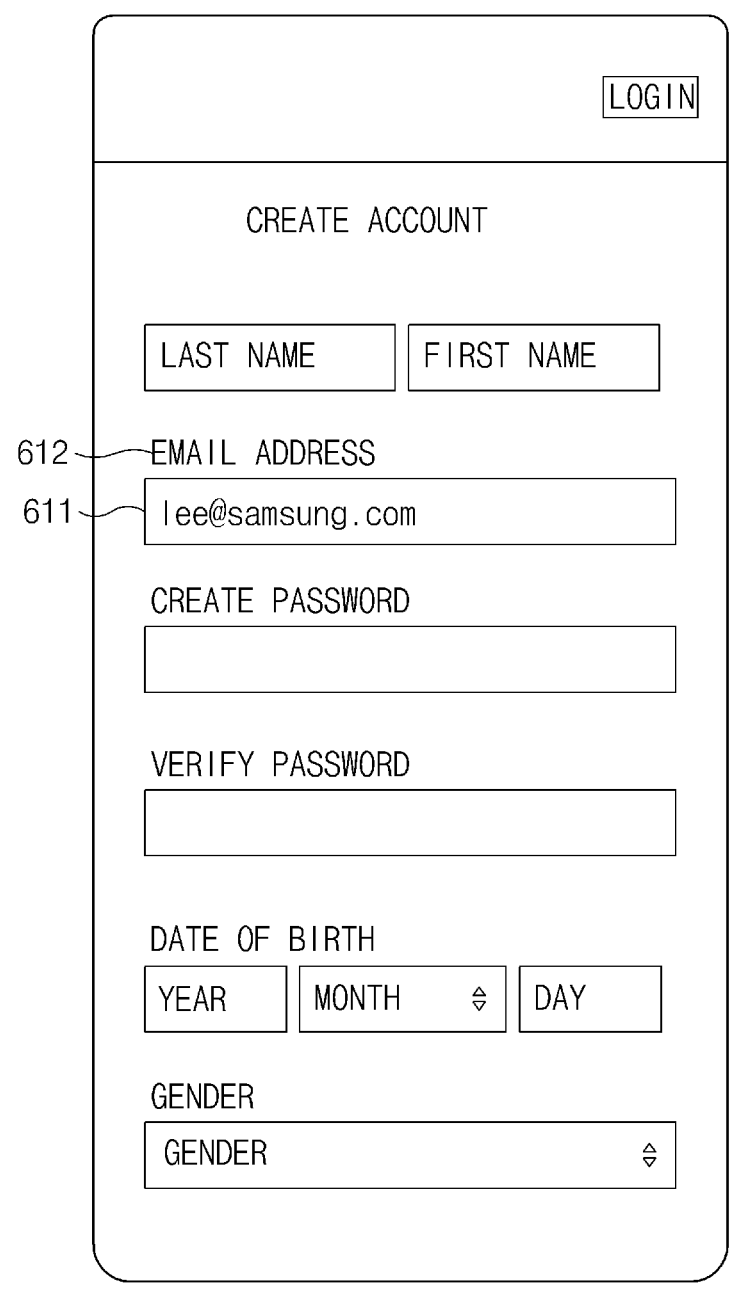
Figure 6B:
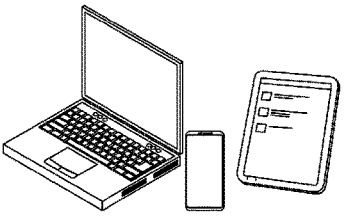
FIG. 6B is a view showing a second UI in which data are input into one of a plurality of second input fields according to an embodiment.

FIG. 6A is a view showing a first UI in which data are input into one of a plurality of first input fields according to an embodiment. FIG. 6B is a view showing a second UI in which data are input into one of a plurality of second input fields according to an embodiment.

FIG. 6A shows the first UI displayed on the display 110 after performing operation 305 of FIG. 3. Referring to FIG. 6A, the data "lee@samsung.com" has been input into a first input field 611 having "email" as an ID, and thereby provided specifically for receiving entry of an email address among the first input fields. According to an embodiment, a text 612 of "email address" may be displayed at an upper end of the first input field 611 into which the data are input. According to an embodiment, the first input field 611 and the text 612 of "email address" may be associated with each other.

According to an embodiment, in operation 313 after operations 307 to 311 of FIG. 3, the processor 160 may input the data of "lee@samsung.com", which are input into the first input field 611, into the second input field associated with the surrounding information that is the same as or corresponding to the text 612 of "email address" corresponding to the surrounding information of the first input field 611.

Referring to FIG. 6B, the text 622 "email address" is displayed in the second UI, and the second input field 621 is disposed at a lower end of the text 622 of "email address."

According to an embodiment, the processor 160 may input the data of "lee@samsung.com" into a second input field 621 labeled by the text 622 of "email address."

According to an embodiment, the first UI may include a plurality of first input fields, and the second UI may include one or more second input fields. In an embodiment, the processor 160 may receive the data input into at least one of the first input fields.

In an embodiment, when the second identifier that is the same as or corresponding to the first identifier of the at least one first input field does not exist in the second UI, the processor 160 may transmit the data related to the data list to the external display device such that the data list including the data input into the at least one first input field is displayed on the external display device.

According to an embodiment, the processor 160 may receive an input for selecting the data input into the at least one first input field included in the data list via the external input device and may input the selected data into the second input field.

Hereinafter, an embodiment in which the processor 160 displays the data list including the data input into the first input field and inputs the selected data into the second input field will be described with reference to FIGS. 7A to 7E.

Figure 7A:
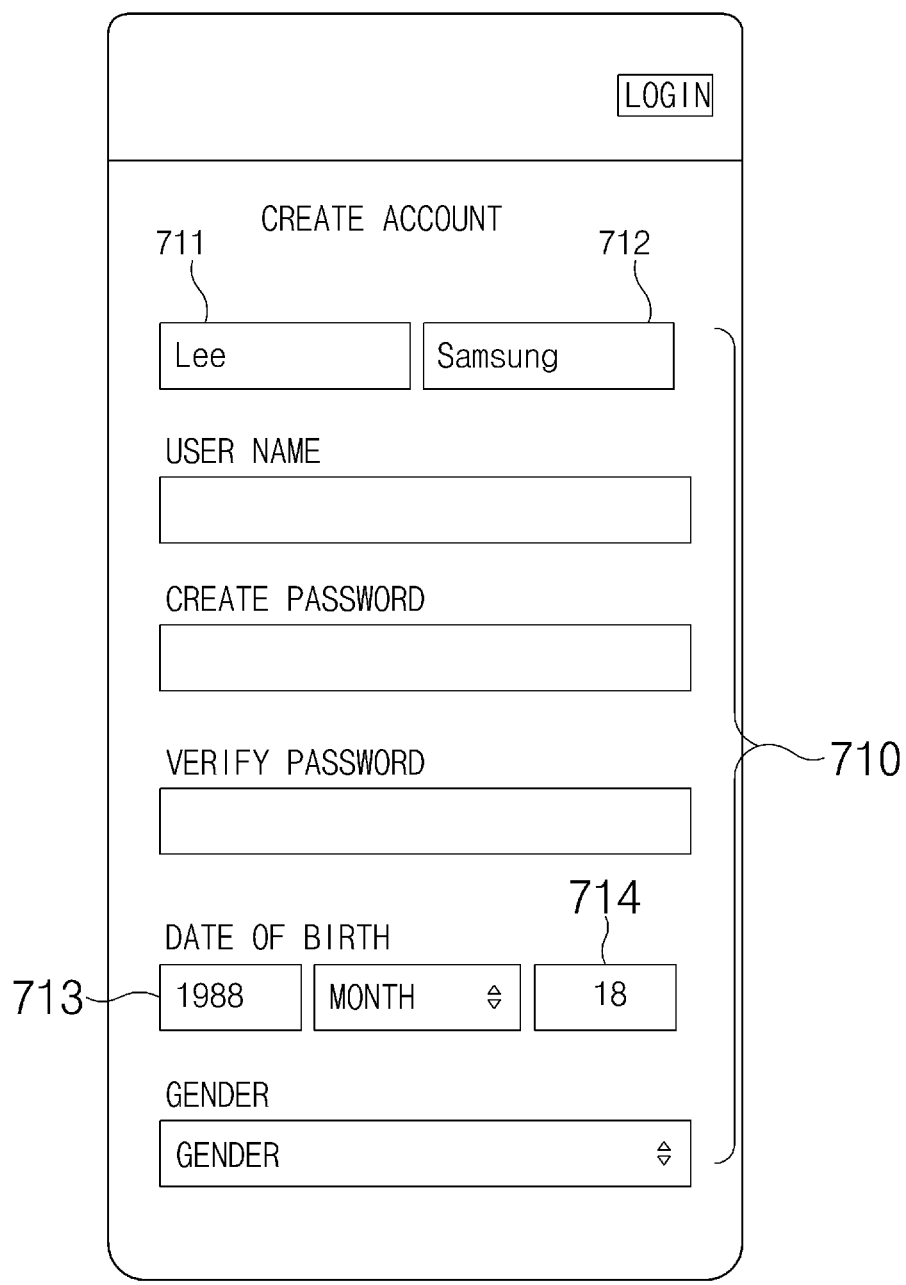
FIG. 7A is a view showing a first UI in which data are displayed in some fields of a plurality of first input fields according to an embodiment.
Figure 7B:
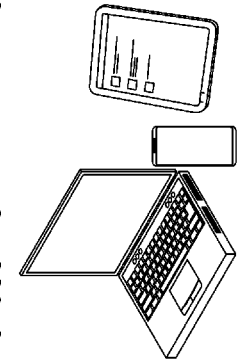
FIG. 7B is a view showing a second UI in which a data list is displayed at a position corresponding to a second input field into which data are to be input according to an embodiment.
Figure 7C:
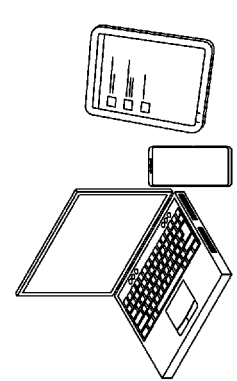
FIG. 7C is a view showing a second UI in which a data list further including an identifier of a first input field corresponding to data is displayed according to an embodiment.
Figure 7D:
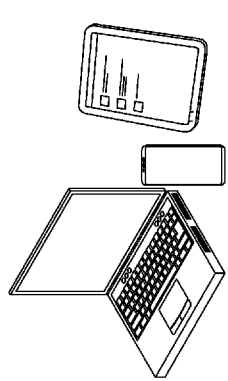
FIG. 7D is a view showing a data list displayed in a pop-up form above a second UI according to an embodiment.
Figure 7E:
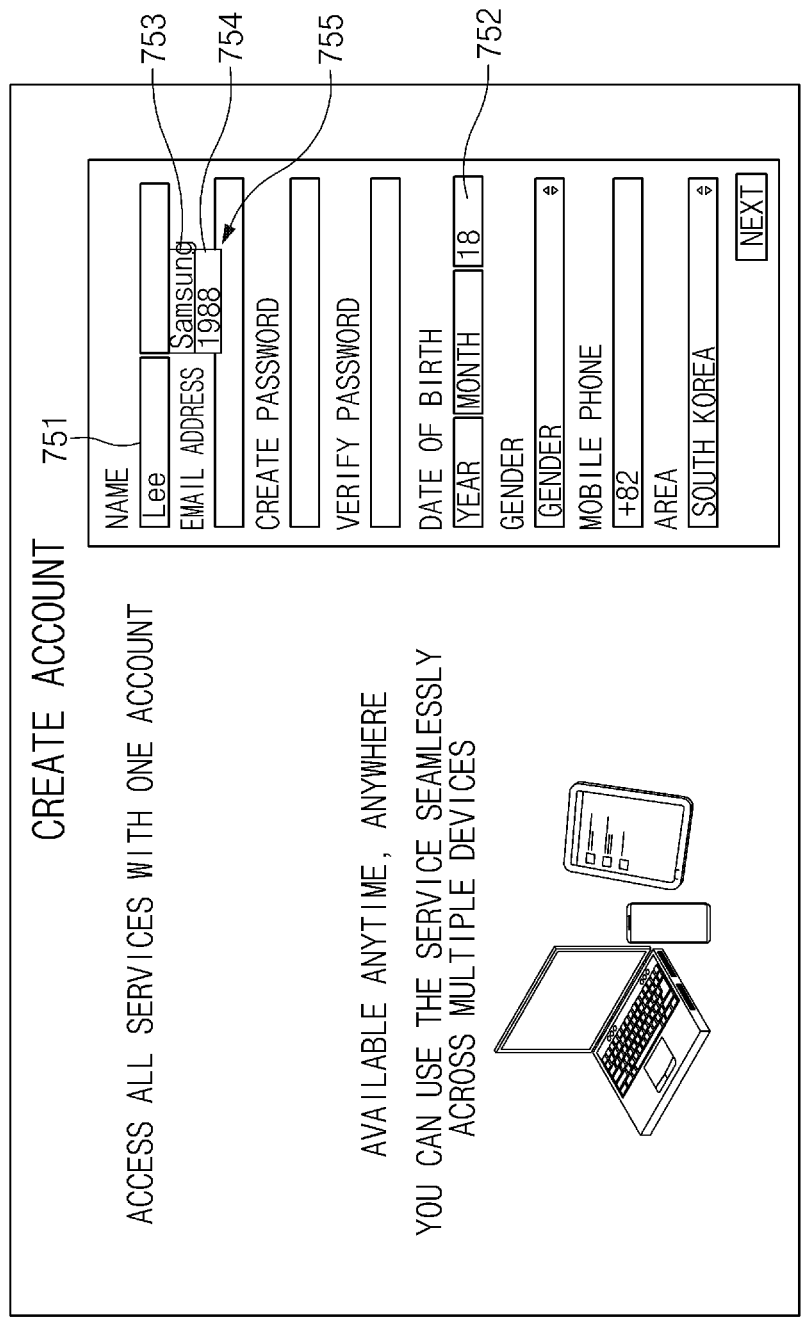
FIG. 7E is a view showing a second UI in which a data list including remaining data, except for data previously input into a second input field, among data is displayed according to an embodiment.

FIG. 7A is a view showing a first UI in which data are displayed in some first input fields of a plurality of first input fields according to an embodiment. FIG. 7B is a view showing a second UI in which a data list is displayed at a position corresponding to a second input field into which data are to be input according to an embodiment. FIG. 7C is a view showing a second UI in which a data list further including an identifier of a first input field corresponding to data is displayed according to an embodiment. FIG. 7D is a view showing a data list displayed in a pop-up form above a second UI according to an embodiment. FIG. 7E is a view showing a second UI in which a data list including remaining data, except for data previously input into a second input field, among data is displayed according to an embodiment.

FIG. 7A shows a screen displayed on the display 110 after performing operation 305 of FIG. 3. Referring to FIG. 7A, among a plurality of first input fields 710, "Lee" is input into a first input field 711 set to receive a last name, "Samsung" is input into a first input field 712 set to receive a first name, d "1988" is input into a first input field 713 set to receive a year of birth, and "18" is input into a first input field 714 set to receive a day of birth.

According to an embodiment, in operation 309 after operation 307 of FIG. 3, the processor 160 may perform operations described below.

According to an embodiment, the data list may therefore include information such as "Lee", "Samsung", "1988" and "18".

According to an embodiment, as shown in FIG. 7B, the processor 160 may display a data list 722. The data list 722 may be displayed at a position corresponding to a second input field 721, into which selected data was or is to be input. According to an embodiment, the second input field may refer to the particular second input field 721 which is provided for receival of the first name, and the processor 160 may display the data list below the second input field 721 for inputting the first name.

According to an embodiment, the processor 160 may detect an input that selecting one of at least one data included in the data list, and may input the selected data into the second input field 721.

According to an embodiment, the processor 160 may determine an order in which the data are arranged in the data list depending on a time sequence in which the data are entered. For instance, the time sequence in which the data are entered in the data list shown in FIG. 7B may be the order of "Lee" 722a, "Samsung" 722b, "1988" 722c, and "18" 722d.

According to an embodiment, as shown in FIG. 7C, the data list may further include an identifier of the first input field. For example, as shown in FIG. 7C, the data list may further include "Last name" 731b as an ID of a first input field corresponding to "Lee" 731a, and "First name" 732b as an ID of a first input field corresponding to "Samsung" 732*a*. According an embodiment, the data list may further include "Birth year" 733*b* as an ID of a first input field corresponding to "1988" 733*a* and "Birth day" 734*b* as an ID of a first input field corresponding to "18" 734*a*.

According to an embodiment, as shown in FIG. 7D, the processor 160 may display a data list 741 as a pop-up. According to an embodiment, the processor 160 may detect an input selecting one of at least one data included in the data list. According to an embodiment, the processor 160 may insert the selected data into a second input field 743 based on a position of a cursor 742 within the plurality of second input fields.

According to an embodiment, the data list may include remaining data, except for the data input into at least one second input field, among the data input into the first input fields. For example, referring to FIG. 7E, data of "Lee" 751 and "18" 752 may be input into the second input field. According to an embodiment, the processor 160 may display the data list 755 including the remaining data of "Samsung" 753 and "1988" 754 except for "Lee" 751 and "18" 752, which are input, as shown in FIG. 7E. According to an embodiment, the processor 160 may receive the input that selects the data included in the displayed data list and may input the selected data into the second input field.

According to various embodiments of the present disclosure, the external display device may be connected to the electronic device 100 while the first UI is displayed on the display of the electronic device 100, and thus the second UI may be displayed on the external display device. According to various embodiments, the second UI including the second input field may be displayed on the external display device, and the data may be input into the second input field. According to various embodiments, the electronic device 100 and the external display device may be disconnected from each other while the second UI including the second input field into which the data are input is displayed, and the processor 160 may display the first UI including the first input field on the display 110. According to various embodiments, the processor 160 may input the data input into the second input field into the first input field. According to various embodiments, the processor 160 may input the data input into the second input field into the first input field using the above-described method.

For example, the processor 160 may detect the event in which the application execution environment is changed to the second driving environment (e.g., the environment in which the external display device is connected to the electronic device 100) from the first driving environment (e.g., the environment or operational state in which the external display device is not connected to the electronic device 100). According to an embodiment, the processor 160 may execute the application in the first driving environment in response to the detection of the event. In an embodiment, the processor 160 may display the first UI on the display 110. In an embodiment, when the second identifier of the second input field and the first identifier of the first input field are the same as or correspond to each other, the processor 160 may input the data, which are input into the second input field, into the first input field. For example, when the id of the second input field and the id of the first input field are the same as or correspond to each other, the data input into the second input field may be input into the first input field.

In an embodiment, when the first identifier that is the same as or corresponding to the second identifier of at least one second input field does not exist in the first UI, the processor 160 may display the data list including the data input into the at least one second input field on the display 110.

Figure 8A:
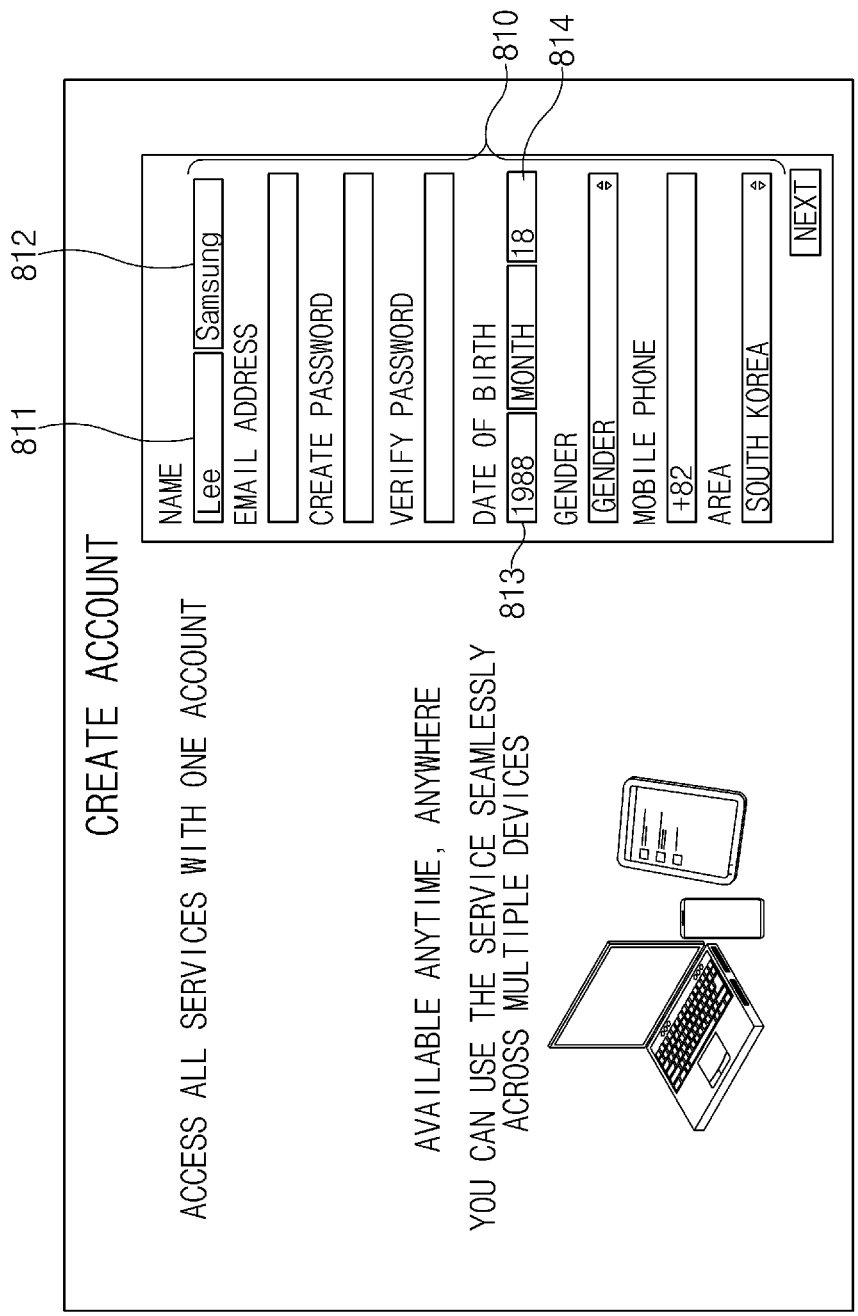
FIG. 8A is a view showing a second UI in which data are displayed in some fields of a plurality of second input fields according to an embodiment.
Figure 8B:
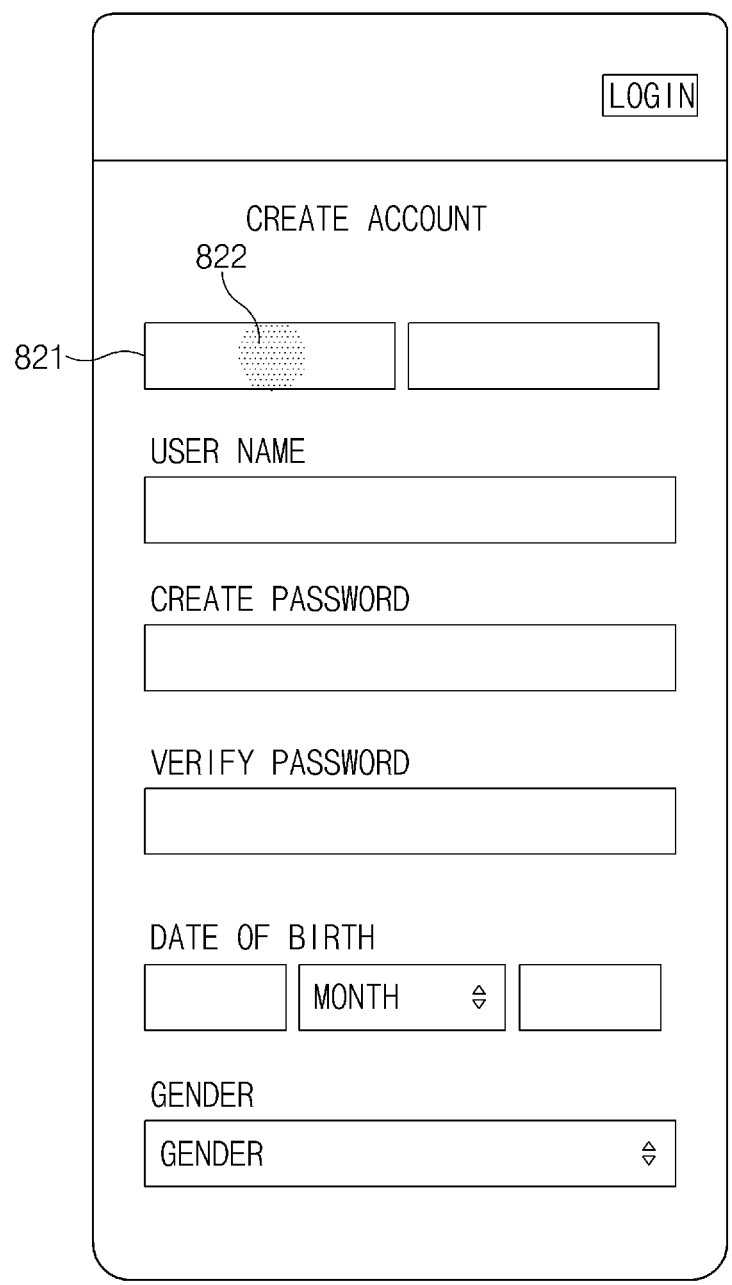
FIG. 8B is a view showing a first UI displayed in a first driving environment according to an embodiment.
Figure 8C:
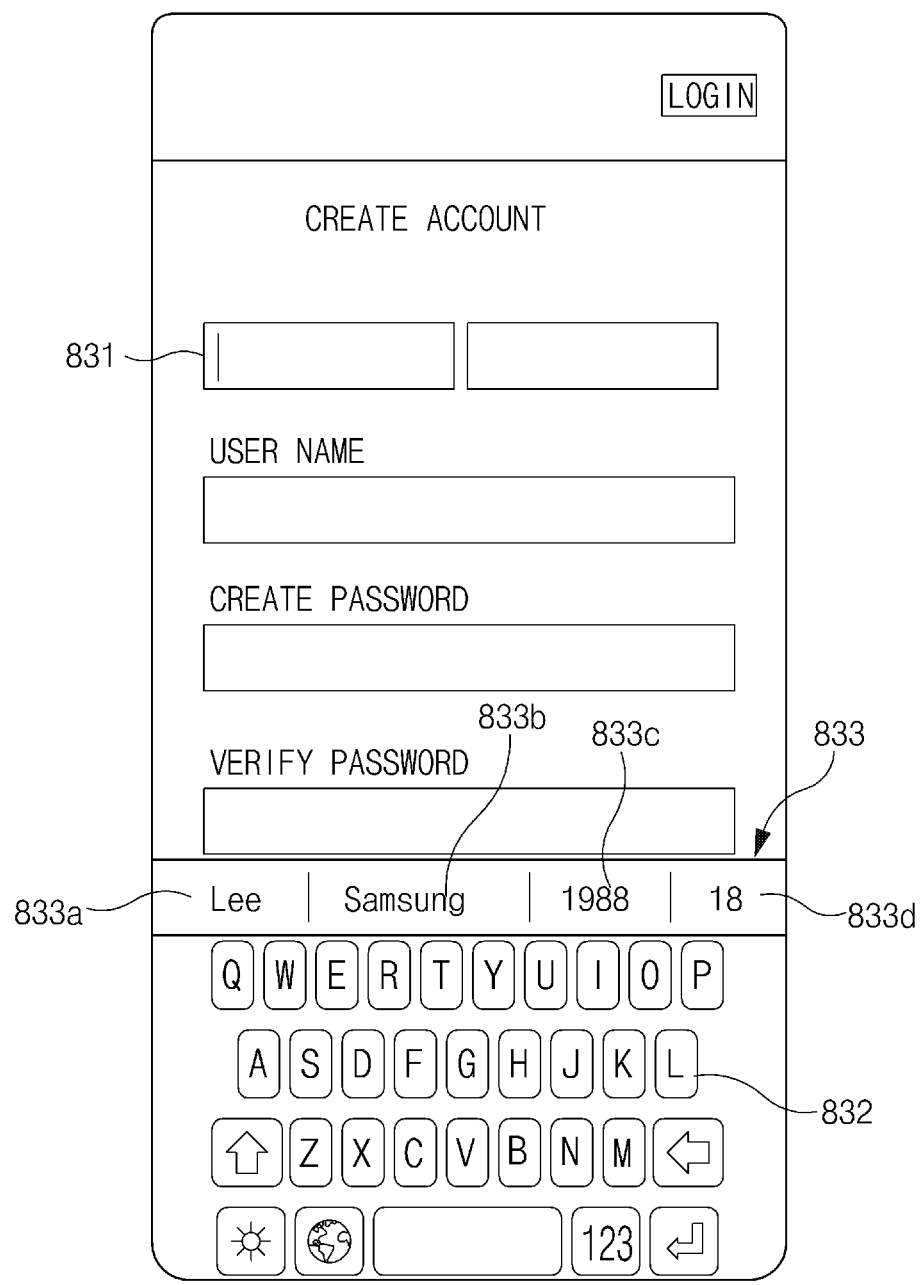
FIG. 8C is a view showing a first UI in which a virtual keyboard and a data list are displayed depending on a selection input with respect to a first input field according to an embodiment.

FIG. 8A is a view showing a second UI in which data are displayed in some second input fields of a plurality of second input fields according to an embodiment. FIG. 8B is a view showing a first UI displayed in a first driving environment according to an embodiment. FIG. 8C is a view showing a first UI in which a virtual keyboard and a data list are displayed depending on a selection input with respect to a first input field according to an embodiment.

Referring to FIG. 8A, "Lee" is input into a second input field 811 for inputting a last name, "Samsung" is input into a second input field 812 for inputting a first name, "1988" is input into a second input field 813 for inputting a year of birth, and "18" is input into a second input field 814 for inputting a data of birth. According to an embodiment, the processor 160 may store the input data 'Lee', 'Samsung', '1988', and '18' and their respective identifiers of the second input field into which data are respectively input in the memory 120.

According to an embodiment, when the application execution environment is changed to the first driving environment from the second driving environment, the processor 160 may display the first UI on the display 110 as shown in FIG. 8B. According to an embodiment, the processor 160 may receive a touch input 822 that selects a first input field 821.

According to an embodiment, the processor 160 may display a virtual keyboard 832 and a data list 833 allowing selection of input data for insertion into the first input field 831. According to an embodiment, the data list 833 may include the 'Lee' 833*a*, 'Samsung' 833*b*, '1988' 833*c*, and '18' 833*d*, which are input into the second input field.

According to an embodiment, the processor 160 may receive the touch input that selects one of the data included in the data list 833 and may input the selected data into the first input field 831.

Figure 9:
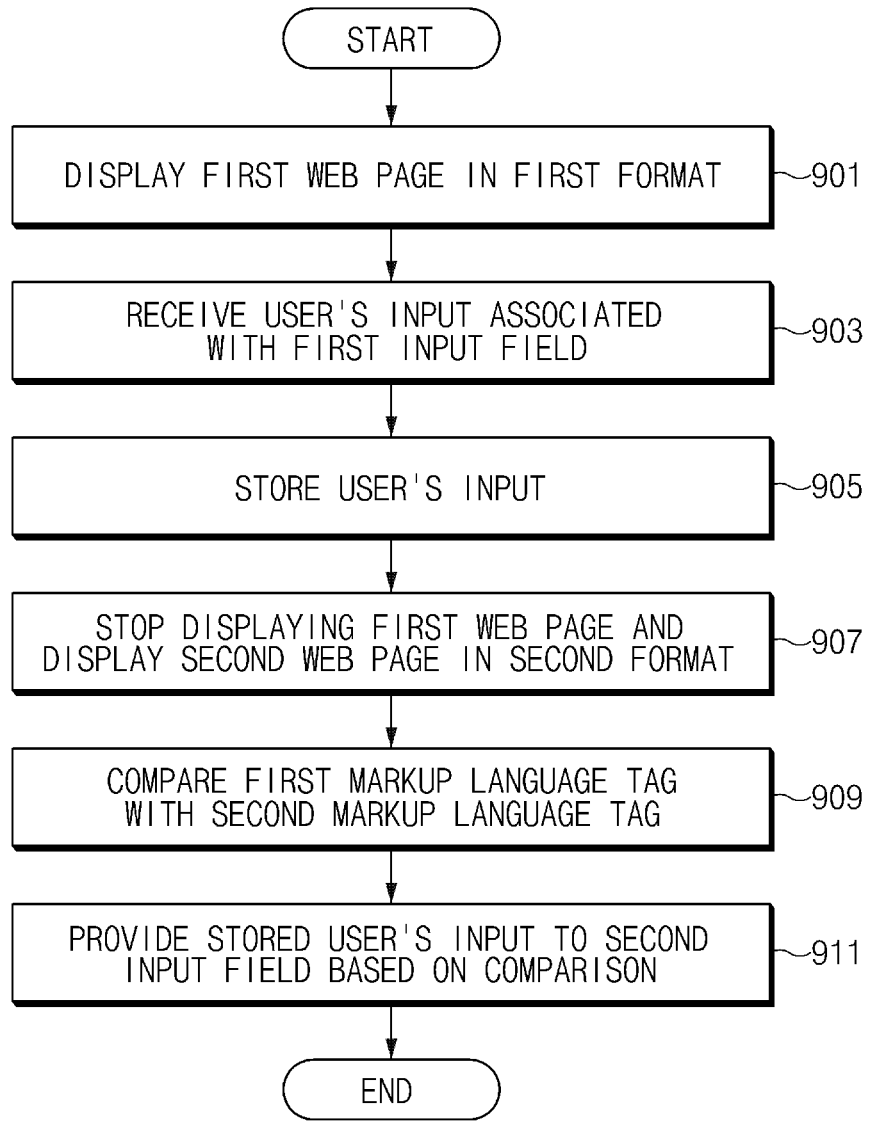
FIG. 9 is a flowchart showing a method for managing data according to an embodiment.

FIG. 9 is a flowchart showing a method for managing data according to an embodiment.

In operation 901, the processor 160 may display a first web page in a first format using a web browser program. According to an embodiment, the first web page may include a first input field and a first markup language tag indicating the first input field.

According to an embodiment, the first format may be a full format to be used with a personal computer (PC) or a mobile format to be used with a mobile device.

According to an embodiment, the markup language tag may be in HTML (hypertext markup language) format.

According to an embodiment, operation 901 may correspond to operation 301 and operation 303. According to an embodiment, the web browser program of operation 901 may correspond to the application of operation 301 and operation 303. According to an embodiment, the first web page of operation 901 may correspond to the first UI of operation 303. According to an embodiment, the first markup language tag of operation 901 may correspond to at least one of the first identifier, the type of the first input field, or the type information of the data that may be input into the first input field of operation 303.

In operation 903, the processor 160 may receive a user's input associated with the first input field.

According to an embodiment, operation 903 may correspond to operation 305 of FIG. 3. According to an embodiment, the user's input of operation 903 may correspond to the data input in operation 305.

In operation 905, the processor 160 may at least temporarily store the user's input in the memory 120.

According to an embodiment, the processor 160 may store the user's input in XML format.

According to an embodiment, operation 905 may correspond to the operation in which the data input are at least temporarily stored in operation 305 of FIG. 3.

In operation 907, the processor 160 may stop displaying the first web page and may display a second web page in a second format using a web browser or allow the external display device to display the second web page.

According to an embodiment, the second web page may include at least a portion of contents of the first web page, and the second web page may include a second input field and a second markup language tag indicating the second input field.

According to an embodiment, when the first format is the full format, the second format may be the mobile format. According to an embodiment, when the first format is the mobile format, the second format may be the full format.

According to an embodiment, the processor 160 may detect that the external display device is connected to the electronic device via the communication circuit. According to an embodiment, responsive to the detection of the connection, the processor 160 may stop displaying the first web page and may allow the external display device to display the second web page.

According to an embodiment, the processor 160 may store a portion of a markup language code of the first web page before or after the detection of the connection. According to an embodiment, the stored portion of the markup language code may include the first markup language tag.

According to an embodiment, operation 907 may correspond to operation 307 and operation 311. According to an embodiment, the operation for detecting the connection of the external display device to the electronic device via the communication circuit may correspond to the operation for detecting the event in which the application execution environment is changed to the second driving environment from the first driving environment in operation 307. According to an embodiment, the second web page of operation 907 may correspond to the second UI of operation 311. According to an embodiment, the second markup language tag of operation 907 may correspond to at least one of the second identifier, the type of the second input field, or the type information of the data that may be input into the second input field of operation 311.

According to an embodiment, the operation that displays the second web page or allows the external display device to display the second web page of operation 907 may correspond to the operation that transmits the data related to the second UI to the external display device of operation 311.

In operation 909, the processor 160 may compare the first markup language tag with the second markup language tag.

According to an embodiment, operation 909 may correspond to operation 313. According to an embodiment, the operation that compares the first markup language tag with the second markup language tag of operation 909 may correspond to the operation that determines whether the first identifier and the second identifier are the same as or correspond to each other of operation 313.

In operation 911, the processor 160 may provide the stored user's input to the second input field or for the second input field based, at least in part, on the comparison of the first markup language tag with the second markup language tag.

According to an embodiment, the processor 160 may input the user's input into the second input field corresponding to the first input field in which the user's input is received. According to an embodiment, the processor 160 may display the stored user's input and may input the user's input displayed by the user's selection into the second input field.

According to an embodiment, operation 911 may correspond to operation 313 of FIG. 3. According to an embodiment, the operation that provides the stored user's input to the second input field or for the second input field based, at least in part, on the comparison of operation 911 may correspond to the operation that inputs the data, which are input into the first input field, into the second input field when the first identifier and the second identifier are the same as or correspond to each other in operation 313.

Figure 10:
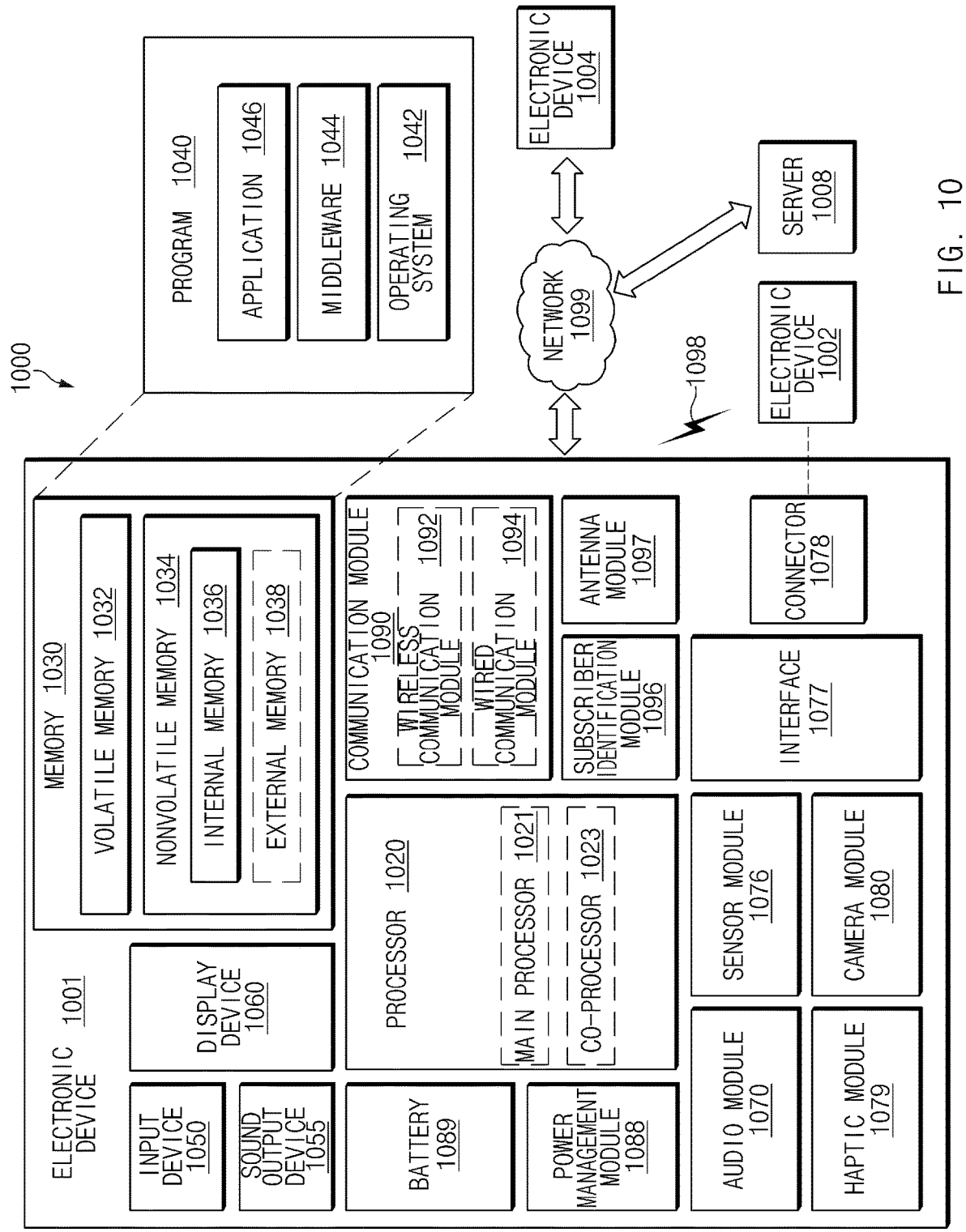
FIG. 10 is a block diagram of an electronic device in a network environment according to various embodiments.

FIG. 10 is a block diagram of an electronic device in a network environment according to various embodiments.

Referring to FIG. 10, an electronic device 1001 may communicate with an electronic device 1002 through a first network 1098 (e.g., a short-range wireless communication) or may communicate with an electronic device 1004 or a server 1008 through a second network 1099 (e.g., a long-distance wireless communication) in a network environment 1000. According to an embodiment, the electronic device 1001 may communicate with the electronic device 1004 through the server 1008. According to an embodiment, the electronic device 1001 may include a processor 1020, a memory 1030, an input device 1050, a sound output device 1055, a display device 1060, an audio module 1070, a sensor module 1076, an interface 1077, a haptic module 1079, a camera module 1080, a power management module 1088, a battery 1089, a communication module 1090, a subscriber identification module 1096, and an antenna module 1097. According to some embodiments, at least one (e.g., the display device 1060 or the camera module 1080) among components of the electronic device 1001 may be omitted or other components may be added to the electronic device 1001. According to some embodiments, some components may be integrated and implemented as in the case of the sensor module 1076 (e.g., a fingerprint sensor, an iris sensor, or an illuminance sensor) embedded in the display device 1060 (e.g., a display).

The processor 1020 may operate, for example, software (e.g., a program 1040) to control at least one of other components (e.g., a hardware or software component) of the electronic device 1001 connected to the processor 1020 and may process and compute a variety of data. The processor 1020 may load a command set or data, which is received from other components (e.g., the sensor module 1076 or the communication module 1090), into a volatile memory 1032, may process the loaded command or data, and may store result data into a nonvolatile memory 1034. According to an embodiment, the processor 1020 may include a main processor 1021 (e.g., a central processing unit or an application processor) and an auxiliary processor 1023 (e.g., a graphic processing device, an image signal processor, a sensor hub processor, or a communication processor), which operates independently from the main processor 1021, additionally or alternatively uses less power than the main processor 1021, or is specified to a designated function. In this case, the auxiliary processor 1023 may operate separately from the main processor 1021 or embedded.

In this case, the auxiliary processor 1023 may control, for example, at least some of functions or states associated with at least one component (e.g., the display device 1060, the sensor module 1076, or the communication module 1090)

among the components of the electronic device 1001 instead of the main processor 1021 while the main processor 1021 is in an inactive (e.g., sleep) state or together with the main processor 1021 while the main processor 1021 is in an active (e.g., an application execution) state. According to an embodiment, the auxiliary processor 1023 (e.g., the image signal processor or the communication processor) may be implemented as a part of another component (e.g., the camera module 1080 or the communication module 1090) that is functionally related to the auxiliary processor 1023. The memory 1030 may store a variety of data used by at least one component (e.g., the processor 1020 or the sensor module 1076) of the electronic device 1001, for example, software (e.g., the program 1040) and input data or output data with respect to one or more instructions associated with the software. The memory 1030 may include the volatile memory 1032 or the nonvolatile memory 1034.

The program 1040 may be stored in the memory 1030 as software and may include, for example, an operating system 1042, a middleware 1044, or an application 1046.

The input device 1050 may be a device for receiving a command or data, which is used for a component (e.g., the processor 1020) of the electronic device 1001, from an outside (e.g., a user) of the electronic device 1001 and may include, for example, a microphone, a mouse, or a keyboard.

The sound output device 1055 may be a device for outputting a sound signal to the outside of the electronic device 1001 and may include, for example, a speaker used for general purposes, such as multimedia play or recordings play, and a receiver used for receiving calls. According to an embodiment, the receiver and the speaker may be either integrally or separately implemented.

The display device 1060 may be a device for visually presenting information to the user of the electronic device 1001 and may include, for example, a display, a hologram device, or a projector and a control circuit for controlling a corresponding device. According to an embodiment, the display device 1060 may include a touch circuitry or a pressure sensor for measuring an intensity of pressure on the touch.

The audio module 1070 may convert a sound and an electrical signal in dual directions. According to an embodiment, the audio module 1070 may obtain the sound through the input device 1050 or may output the sound through an external electronic device (e.g., the electronic device 1002 (e.g., a speaker or a headphone)) wired or wirelessly connected to the sound output device 1055 or the electronic device 1001.

The sensor module 1076 may generate an electrical signal or a data value corresponding to an operating state (e.g., power or temperature) inside or an environmental state outside the electronic device 1001. The sensor module 1076 may include, for example, a gesture sensor, a gyro sensor, a barometric pressure sensor, a magnetic sensor, an acceleration sensor, a grip sensor, a proximity sensor, a color sensor, an infrared sensor, a biometric sensor, a temperature sensor, a humidity sensor, or an illuminance sensor.

The interface 1077 may support a designated protocol wired or wirelessly connected to the external electronic device (e.g., the electronic device 1002). According to an embodiment, the interface 1077 may include, for example, an HDMI (high-definition multimedia interface), a USB (universal serial bus) interface, an SD card interface, or an audio interface.

A connecting terminal 1078 may include a connector that physically connects the electronic device 1001 to the external electronic device (e.g., the electronic device 1002), for example, an HDMI connector, a USB connector, an SD card connector, or an audio connector (e.g., a headphone connector).

The haptic module 1079 may convert an electrical signal to a mechanical stimulation (e.g., vibration or movement) or an electrical stimulation perceived by the user through tactile or kinesthetic sensations. The haptic module 1079 may include, for example, a motor, a piezoelectric element, or an electric stimulator.

The camera module 1080 may shoot a still image or a video image. According to an embodiment, the camera module 1080 may include, for example, at least one lens, an image sensor, an image signal processor, or a flash.

The power management module 1088 may be a module for managing power supplied to the electronic device 1001 and may serve as at least a part of a power management integrated circuit (PMIC).

The battery 1089 may be a device for supplying power to at least one component of the electronic device 1001 and may include, for example, a non-rechargeable (primary) battery, a rechargeable (secondary) battery, or a fuel cell.

The communication module 1090 may establish a wired or wireless communication channel between the electronic device 1001 and the external electronic device (e.g., the electronic device 1002, the electronic device 1004, or the server 1008) and support communication execution through the established communication channel. The communication module 1090 may include at least one communication processor operating independently from the processor 1020 (e.g., the application processor) and supporting the wired communication or the wireless communication. According to an embodiment, the communication module 1090 may include a wireless communication module 1092 (e.g., a cellular communication module, a short-range wireless communication module, or a GNSS (global navigation satellite system) communication module) or a wired communication module 1094 (e.g., an LAN (local area network) communication module or a power line communication module) and may communicate with the external electronic device using a corresponding communication module among them through the first network 1098 (e.g., the short-range communication network such as a Bluetooth, a WiFi direct, or an IrDA (infrared data association)) or the second network 1099 (e.g., the long-distance wireless communication network such as a cellular network, an internet, or a computer network (e.g., LAN or WAN)). The above-mentioned various communication modules 1090 may be implemented into one chip or into separate chips, respectively.

According to an embodiment, the wireless communication module 1092 may identify and authenticate the electronic device 1001 using user information stored in the subscriber identification module 1096 in the communication network.

The antenna module 1097 may include one or more antennas to transmit or receive the signal or power to or from an external source. According to an embodiment, the communication module 1090 (e.g., the wireless communication module 1092) may transmit or receive the signal to or from the external electronic device through the antenna suitable for the communication method.

Some components among the components may be connected to each other through a communication method (e.g., a bus, a GPIO (general purpose input/output), an SPI (serial peripheral interface), or an MIPI (mobile industry processor interface)) used between peripheral devices to exchange signals (e.g., a command or data) with each other.

According to an embodiment, the command or data may be transmitted or received between the electronic device 1001 and the external electronic device 1004 through the server 1008 connected to the second network 1099. Each of the electronic devices 1002 and 1004 may be the same or different types as or from the electronic device 1001. According to an embodiment, all or some of the operations performed by the electronic device 1001 may be performed by another electronic device or a plurality of external electronic devices. When the electronic device 1001 performs some functions or services automatically or by request, the electronic device 1001 may request the external electronic device to perform at least some of the functions related to the functions or services, in addition to or instead of performing the functions or services by itself. The external electronic device receiving the request may carry out the requested function or the additional function and transmit the result to the electronic device 1001. The electronic device 1001 may provide the requested functions or services based on the received result as is or after additionally processing the received result. To this end, for example, a cloud computing, distributed computing, or client-server computing technology may be used.

The electronic device according to an embodiment disclosed in the present disclosure may include a display 110, a communication circuit 150, a processor 160 functionally connected to the display 110 and the communication circuit 150, and a memory 120 functionally connected to the processor 160 and configured to store a web browser program. The memory 120 may store instructions, when executed by the processor 160, allowing the processor 160 to display a first web page that includes a first input field and a first markup language tag indicating the first input field in a first format using the web browser program, to receive a user's input associated with the first input field, to at least temporarily store the user's input in the memory 120, to stop displaying the first web page, to display a second web page, which includes at least a portion of contents of the first web page and including a second input field and a second markup language tag indicating the second input field, in a second format on the display 110 or an external display device 300 using the web browser program, to compare the first markup language tag with the second markup language tag, and to provide the stored user's input to the second input field or for the second input field based, at least in part, on the compared result.

According to an embodiment, the first format may be a full format to be used in a personal computer (PC), and the second format may be a mobile format to be used in a mobile device.

According to an embodiment, the second format may be the full format to be used in a personal computer (PC), and the first format may be the mobile format to be used in a mobile device.

According to an embodiment, the markup language tag may be a hypertext markup language (HTML) format.

According to an embodiment, the instructions may allow the processor 160 to store the user's input in an XML format.

According to an embodiment, the instructions may allow the processor 160 to detect that the external display device 300 is connected to the electronic device via the communication circuit 150 and to stop displaying the first web page in response to the detection such that the external display device 300 displays the second web page.

According to an embodiment, the instructions allow the processor 160 to store a portion of a markup language code of the first web page before or after the detection, and the portion includes the first markup language tag.

In addition, an electronic device according to an embodiment described in the present disclosure may include a touch screen display 110, a processor 160 electrically connected to the touch screen display 110, and a memory 120 electrically connected to the processor 160. The memory 120 may store instructions, when executed by the processor 160, allowing the processor 160 to execute an application in a first driving environment, to display a first UI, which includes a first identifier corresponding to the first input field, of the application including a first input field on the touch screen display 110, to receive data input into the first input field via the touch screen display 110, to detect an event in which an application execution environment is changed to a second driving environment from the first driving environment, to execute the application in the second driving environment in response to the detection of the event, to transmit data associated with a second UI to the external display device 300 such that the second UI, which includes a second input field and a second identifier corresponding to the second input field, of the application is displayed on the external display device 300 functionally connected to the electronic device in the second driving environment, and to input the data input into the first input field into the second input field when the first identifier and the second identifier are the same as or correspond to each other.

According to an embodiment, the first input field and the second input field may be a text input type of input field, a numeric input type of input field, or a selection input type of input field.

According to an embodiment, the instructions, when executed by the processor 160, may allow the processor 160 to input the data input into the first input field into the second input field when the first identifier and the second identifier are not the same as or do not correspond to each other and the type of the first input field and the type of the second input field are the same as each other.

According to an embodiment, the first input field may further include a type information of data input into the first input field, the second input field may further include a type information of data input into the second input field, and the instructions, when executed by the processor 160, may allow the processor 160 to input the data input into the first input field into the second input field when the first identifier and the second identifier are not the same as or do not correspond to each other and the type information of the data input into the first input field and the type information of the data input into the second input field are the same as or corresponding to each other.

According to an embodiment, the first input field may correspond to a child node of a first tree structure whose each node has an identifier, the second input field may correspond to a child node of a second tree structure whose each node has an identifier, and the instructions, when executed by the processor 160, may allow the processor 160 to input the data input into the first input field into the second input field when the first identifier and the second identifier are not the same as or do not correspond to each other and an identifier of a parent node of the child node corresponding to the first input field and an identifier of a parent node of the child node corresponding to the second input field are the same as or corresponding to each other.

According to an embodiment, the electronic device may be connected to an external input device, the first UI may include a plurality of first input fields, the second UI may include one or more second input fields, and the instructions, when executed by the processor 160, may allow the processor 160 to receive data input into at least one of the first input fields via the touch screen display 110, to transmit data associated with a data list to the external display device such that the data list including the data input into the at least one first input field is displayed on the external display device when the second identifier that is the same as or corresponding to the first identifier of the at least one first input field does not exist in the second UI, to receive an input that selects the data input into the at least one first input field included in the data list via the external input device, and to input the selected data into the second input field.

According to an embodiment, the data list may further include an identifier of the first input field into which the data are input.

According to an embodiment, the instructions, when executed by the processor 160, may allow the processor 160 to display the data list on a position corresponding to the second input field into which the selected data are input.

According to an embodiment, the data list may include remaining data except for the data input into the at least one second input field among the data input into the at least one first input field.

In addition, a method for inputting data of an electronic device according to an embodiment described in the present disclosure may include executing an application in a first driving environment, displaying 110 a first UI, which includes a first identifier corresponding to the first input field, of the application including a first input field, receiving data input into the first input field, detecting an event in which an application execution environment is changed to a second driving environment from the first driving environment, executing the application in the second driving environment in response to the detection of the event, transmitting data associated with a second UI to the external display device 300 such that the second UI, which includes a second input field and a second identifier corresponding to the second input field, of the application is displayed on the external display device 300 functionally connected to the electronic device in the second driving environment, and inputting the data input into the first input field into the second input field when the first identifier and the second identifier are the same as or correspond to each other.

According to an embodiment, the method may further include inputting the data input into the first input field into the second input field when the first identifier and the second identifier are not the same as or do not correspond to each other and the type of the first input field and the type of the second input field are the same as each other, and the first input field and the second input field may be a text input type of input field, a numeric input type of input field, or a selection input type of input field.

According to an embodiment, the first UI may include a plurality of first input fields, the second UI may include one or more second input fields, the receiving of the data input into the first input field may include receiving the data input into at least one first input field among the first input fields, and the method may further include transmitting data associated with the data list to the external display device 300 such that the data list including the data input into the at least one first input field is displayed on the external display device 300 when the second identifier that is the same as or corresponding to the first identifier of the at least one first input field does not exist in the second UI, receiving an input that selects the data input into the at least one first input field included in the data list, and inputting the selected data into the second input field.

According to an embodiment, the data list may include remaining data except for the data input into the at least one second input field among the data input into the at least one first input field.

The electronic device according to various embodiments disclosed in the present disclosure may be various types of devices. The electronic device may include, for example, at least one of a portable communication device (e.g., a smartphone), a computer device, a portable multimedia device, a mobile medical appliance, a camera, a wearable device, or a home appliance. The electronic device according to an embodiment of the present disclosure should not be limited to the above-mentioned devices.

It should be understood that various embodiments of the present disclosure and terms used in the embodiments do not intend to limit technologies disclosed in the present disclosure to the particular forms disclosed herein; rather, the present disclosure should be construed to cover various modifications, equivalents, and/or alternatives of embodiments of the present disclosure. With regard to description of drawings, similar components may be assigned with similar reference numerals. As used herein, singular forms may include plural forms as well unless the context clearly indicates otherwise. In the present disclosure disclosed herein, the expressions "A or B", "at least one of A or/and B", "A, B, or C" or "one or more of A, B, or/and C", and the like used herein may include any and all combinations of one or more of the associated listed items. The expressions "a first", "a second", "the first", or "the second", used in herein, may refer to various components regardless of the order and/or the importance, but do not limit the corresponding components. The above expressions are used merely for the purpose of distinguishing a component from the other components. It should be understood that when a component (e.g., a first component) is referred to as being (operatively or communicatively) "connected," or "coupled," to another component (e.g., a second component), it may be directly connected or coupled directly to the other component or any other component (e.g., a third component) may be interposed between them.

The term "module" used herein may represent, for example, a unit including one or more combinations of hardware, software and firmware. The term "module" may be interchangeably used with the terms "logic", "logical block", "part" and "circuit". The "module" may be a minimum unit of an integrated part or may be a part thereof. The "module" may be a minimum unit for performing one or more functions or a part thereof. For example, the "module" may include an application-specific integrated circuit (ASIC).

Various embodiments of the present disclosure may be implemented by software (e.g., the program 1040) including one or more instructions stored in a machine-readable storage media (e.g., an internal memory 1036 or an external memory 1038) readable by a machine (e.g., a computer). The machine may be a device that calls the instruction from the machine-readable storage media and operates depending on the called instruction and may include the electronic device (e.g., the electronic device 1001). When the instruction is executed by the processor (e.g., the processor 1020), the processor may perform a function corresponding to the instruction directly or using other components under the control of the processor. The instruction may include a code generated or executed by a compiler or an interpreter. The machine-readable storage media may be provided in the form of non-transitory storage media. Here, the term "non-transitory", as used herein, is a limitation of the medium itself (i.e., tangible, not a signal) as opposed to a limitation on data storage persistency.

According to an embodiment, the method according to various embodiments disclosed in the present disclosure may be provided as a part of a computer program product. The computer program product may be traded between a seller and a buyer as a product. The computer program product may be distributed in the form of machine-readable storage medium (e.g., a compact disc read only memory (CD-ROM)) or may be distributed through an application store (e.g., a Play Store™). In the case of online distribution, at least a portion of the computer program product may be temporarily stored or generated in a storage medium such as a memory of a manufacturer's server, an application store's server, or a relay server.

Each component (e.g., the module or the program) according to various embodiments may include at least one of the above components, and a portion of the above sub-components may be omitted, or additional other sub-components may be further included. Alternatively or additionally, some components (e.g., the module or the program) may be integrated in one component and may perform the same or similar functions performed by each corresponding components prior to the integration. Operations performed by a module, a programming, or other components according to various embodiments of the present disclosure may be executed sequentially, in parallel, repeatedly, or in a heuristic method. Also, at least some operations may be executed in different sequences, omitted, or other operations may be added.

While the present disclosure has been shown and described with reference to various embodiments thereof, it will be understood by those skilled in the art that various changes in form and details may be made therein without departing from the present disclosure as defined by the appended claims and their equivalents.

What is claimed is:
1. An electronic device, comprising:
   a touch screen display;
   at least one processor; and
   a memory storing instructions executable by the at least one processor to cause the electronic device to:
      execute an application in a first operational state;
      display a first user interface (UI) for the application on the touch screen display, the first UI including a first input field and a first identifier identifying the first input field;
      receive data input to the first input field of the application via the touch screen display;
      in response to detecting communicative coupling of an external display device to the electronic device, change the first operational state to a second operational state including terminating the application into which the data input was received, and re-execute the application on the electronic device in the second operational state;
      transmit data to the external display device for display of the re-executed application on the external display device, the re-executed application including a second UI having a second input field, wherein a second identifier corresponds to the second input field; and
      after terminating the application and after transmitting the data for display of the re-executed application on the external display device, when the first identifier corresponds to the second identifier, automatically insert the received data input into the second input field of the re-executed application,
   wherein the first input field and the second input field are indicated within a first tree data-structure and a second tree data-structure, respectively, and
   wherein the instructions are further executable by the at least one processor to cause the electronic device to:
   when the first identifier of the first input field fails to correspond to the second identifier of the second input field:
      identify, within the first tree data-structure, a first parent-identifier indicating a parent node to the first input field,
      identify, within the second tree data-structure, a second parent-identifier indicating a parent node to the second input field, and
      when the first parent-identifier matches the second parent-identifier, insert the received data input into the second input field.

2. The electronic device of claim 1, wherein the first input field and the second input field are configured to receive one or more of text data, numeric data, or selection of a preset element among a plurality of selectable elements.

3. The electronic device of claim 2, wherein the instructions are further executable by the at least one processor to cause the electronic device to:
   when the first identifier does not correspond to the second identifier, detect whether a type of the first input field corresponds to a type of the second input field; and
   when the type of the first input field corresponds to the type of the second input field, insert the received data input into the second input field.

4. The electronic device of claim 1, wherein the first identifier indicates a type of data receivable by the first input field, and the second identifier indicates a type of data receivable by the second input field.

5. The electronic device of claim 1, wherein the first input field corresponds to a first child node of a first tree structure, the second input field corresponds to a second child node of a second tree structure,
   wherein the first and second child nodes of the first and second tree structures each include an identifier, respectively, and
   wherein the instructions are further executable by the at least one processor to cause the electronic device to:
   when the first identifier does not correspond to the second identifier, detect whether the identifier of a first parent node of the first child node of the first input field corresponds a second parent node of the second child node of the second input field; and
   when the first parent node of the first child node of the first input field corresponds to the second parent node of the second child node of the second input field, insert the received data input into the second input field.

6. The electronic device of claim 1, wherein the electronic device is connected to an external input device, the first UI includes a plurality of first input fields, and the second UI includes one or more second input fields, and
   wherein the instructions are further executable by the at least one processor to cause the electronic device to:
   generate a data list including the data input into the first input field,
   when the first identifier does not correspond to any identifier of the second UI, transmit the data list to the external display device for display, and in response to detecting a selection of an entry from the transmitted data list, insert the selected entry into the second input field.

7. The electronic device of claim 6, wherein the data list further includes an identifier identifying a type of data receivable the first input field.

8. The electronic device of claim 6,
wherein the data list is displayed to a position on the external display device that corresponds to the second input field.

9. The electronic device of claim 6, wherein the instructions are further executable by the at least one processor to cause the electronic device to:
after the inserting the selected entry into the second input field, remove the selected entry from the data list and maintain display of any remaining unselected entries in the data list.

10. The electronic device of claim 1,
wherein the first operational state is changed to the second operational state, including terminating the application into which the data input was received, and re-executing the application, in response to the communicative coupling of the external display device, and
wherein when the second UI is displayed on the external display, the first UI is removed from the touch screen display.

11. A method in an electronic device, comprising:
executing an application in a first operational state;
displaying a first user interface (UI) for the application on a touch screen display, the first UI including a first input field and a first identifier identifying the first input field;
receiving data input to the first input field via the touch screen display;
in response to detecting communicative coupling of an external display device to the electronic device, changing the first operational state to a second operational state including terminating the application into which the data input was received, and re-executing the application on the electronic device in the second operational state;
transmitting data to the external display device for display of the re-executed application on the external display device, the re-executed application including a second UI having a second input field, wherein a second identifier corresponds wherein a second identifier corresponds to the second input field; and
after terminating the application and after displaying the re-executed application on the external display device, when the first identifier corresponds to the second identifier, automatically inserting, by the electronic device, the received data input into the second input field of the re-executed application,
wherein the first input field and the second input field are indicated within a first tree data-structure and a second tree data-structure, respectively, and, the method further comprising:
when the first identifier of the first input field fails to correspond to the second identifier of the second input field:
identifying, within the first tree data-structure, a first parent-identifier indicating a parent node to the first input field,
identifying, within the second tree data-structure, a second parent-identifier indicating a parent node to the second input field, and
when the first parent-identifier matches the second parent-identifier, inserting the received data input into the second input field.

12. The method of claim 11, further comprising:
when the first identifier does not correspond to the second identifier, detecting whether a type of the first input field corresponds to a type of the second input field; and
when the type of the first input field corresponds to the type of the second input field, inserting the received data input into the second input field,
wherein the type of the first input field and the type of the second input field include a first type for receiving text data, a second type for receiving numeric data, and a third type for receiving selection of a preset element among a plurality of selectable elements.

13. The method of claim 12, wherein the first UI includes a plurality of first input fields, the second UI includes one or more second input fields, and the receiving of the data input includes receiving the data input into at least one particular first input field among the plurality of first input fields, the method further comprising:
generating a data list including the data input into the first input field,
when the first identifier does not correspond to any identifier of the second UI, transmitting the data list to an external display device for display, and
in response to detecting a selection of an entry from the transmitted data list, inserting the selected entry into the second input field.

14. The method of claim 13, further comprising:
after the inserting the selected entry into the second input field, removing the selected entry from the data list and maintain display of any remaining unselected entries in the data list.

15. The method of claim 11,
wherein the first operational state is changed to the second operational state, including terminating the application into which the data input was received, and re-executing the application, in response to the communicative coupling of the external display device, and
wherein when the second UI is displayed on the external display, the first UI is removed from the touch screen display.

* * * * *